US008625256B2

(12) United States Patent
Schmid

(10) Patent No.: US 8,625,256 B2
(45) Date of Patent: Jan. 7, 2014

(54) CLOSED BUSBAR SYSTEM FOR LOW-VOLTAGE DISTRIBUTION

(76) Inventor: August Schmid, Sharjah (AE)

( * ) Notice: Subject to any disclaimer, the term of this patent is extended or adjusted under 35 U.S.C. 154(b) by 166 days.

(21) Appl. No.: 12/993,869

(22) PCT Filed: May 16, 2009

(86) PCT No.: PCT/IB2009/005916
§ 371 (c)(1),
(2), (4) Date: Nov. 22, 2010

(87) PCT Pub. No.: WO2009/141728
PCT Pub. Date: Nov. 26, 2009

(65) Prior Publication Data
US 2011/0075327 A1    Mar. 31, 2011

(30) Foreign Application Priority Data
May 23, 2008    (DE) .......................... 10 2008 026 507

(51) Int. Cl.
*H02B 1/26*    (2006.01)
(52) U.S. Cl.
USPC ........... 361/624; 361/611; 361/637; 361/639; 361/676; 361/678; 174/70 B; 174/71 B; 174/72 B; 174/88 B; 174/93
(58) Field of Classification Search
USPC ......... 361/600, 601, 611, 622, 624, 627, 637, 361/639, 641 M, 644, 648, 659, 675–678; 174/70 B, 71 B, 72 B, 74 A, 79, 80, 85, 174/88 B, 93, 99 B, 129 B, 133 B, 149 B; 363/142, 144, 147; 439/114, 115, 119, 439/212, 213
See application file for complete search history.

(56) References Cited

U.S. PATENT DOCUMENTS

| | | | | | |
|---|---|---|---|---|---|
| 3,096,131 | A | * | 7/1963 | Adams | 439/212 |
| 3,113,820 | A | * | 12/1963 | Norden | 439/114 |
| 3,211,960 | A | * | 10/1965 | Dorfman et al. | 361/673 |
| 3,840,785 | A | * | 10/1974 | Olashaw | 361/614 |
| 3,858,092 | A | * | 12/1974 | Olashaw et al. | 361/624 |
| 4,031,433 | A | * | 6/1977 | Olashaw | 361/608 |
| 4,301,493 | A | * | 11/1981 | Schweikle et al. | 361/640 |
| 4,316,234 | A | * | 2/1982 | Takagi et al. | 361/614 |

(Continued)

FOREIGN PATENT DOCUMENTS

CH    589 369    6/1977
DE    31 03 433 C2    11/1982

(Continued)

OTHER PUBLICATIONS

European Search Report and English translation, Aug. 29, 2012, EPO Netherlands.

*Primary Examiner* — Michail V Datskovskiy
(74) *Attorney, Agent, or Firm* — Bacon & Thomas, PLLC

(57) ABSTRACT

Closed busbar system for three-phase low voltage distribution, comprising phase bars that extend lengthways and transverse branch bars, one of which is respectively electrically connected to an associated phase bar. The phase bars are maintained in an inserted manner in a socket of an insulating housing for reducing the cross-section or increasing the power in such a manner that a cooling channel associated with each phase track is formed between the rear side of the phase tracks and the base inner side of the socket.

15 Claims, 3 Drawing Sheets

(56) References Cited

U.S. PATENT DOCUMENTS

| | | | | |
|---|---|---|---|---|
| 4,374,405 A | * | 2/1983 | Olashaw et al. | 361/639 |
| 4,667,268 A | * | 5/1987 | Mrowka | 361/634 |
| 4,733,329 A | | 3/1988 | Barner | |
| 4,740,865 A | * | 4/1988 | Barner | 361/627 |
| 4,916,574 A | | 4/1990 | Hancock | |
| 5,046,173 A | * | 9/1991 | Wall, Jr. | 361/634 |
| 5,640,295 A | * | 6/1997 | Harris et al. | 361/644 |
| 5,847,921 A | | 12/1998 | Kim | |
| 5,854,445 A | * | 12/1998 | Graham et al. | 174/99 B |
| 5,995,362 A | | 11/1999 | Morel | |
| 7,121,856 B2 | * | 10/2006 | Fontana et al. | 439/212 |
| 7,298,606 B2 | * | 11/2007 | M'Sadoques et al. | 361/644 |
| 7,334,315 B2 | * | 2/2008 | Wiant et al. | 29/592.1 |
| 7,414,828 B2 | * | 8/2008 | Birner | 361/624 |
| 7,719,823 B2 | * | 5/2010 | Josten et al. | 361/611 |
| 7,826,201 B2 | * | 11/2010 | Schell et al. | 361/611 |
| 8,134,070 B2 | * | 3/2012 | Hirschfeld | 174/72 B |
| 2008/0038947 A1 | * | 2/2008 | Wagener | 439/116 |
| 2011/0038103 A1 | * | 2/2011 | Hudgins et al. | 361/637 |

FOREIGN PATENT DOCUMENTS

| | | |
|---|---|---|
| DE | G 90 15 107.0 | 4/1991 |
| EP | 0 025 947 A1 | 4/1981 |
| EP | 0 837 534 A1 | 4/1998 |
| EP | 1 544 972 A1 | 6/2005 |
| IE | 51164 | 10/1986 |
| JP | 55088508 A | 7/1980 |
| JP | 58037709 U | 3/1983 |
| SU | 491 178 | 2/1976 |

* cited by examiner

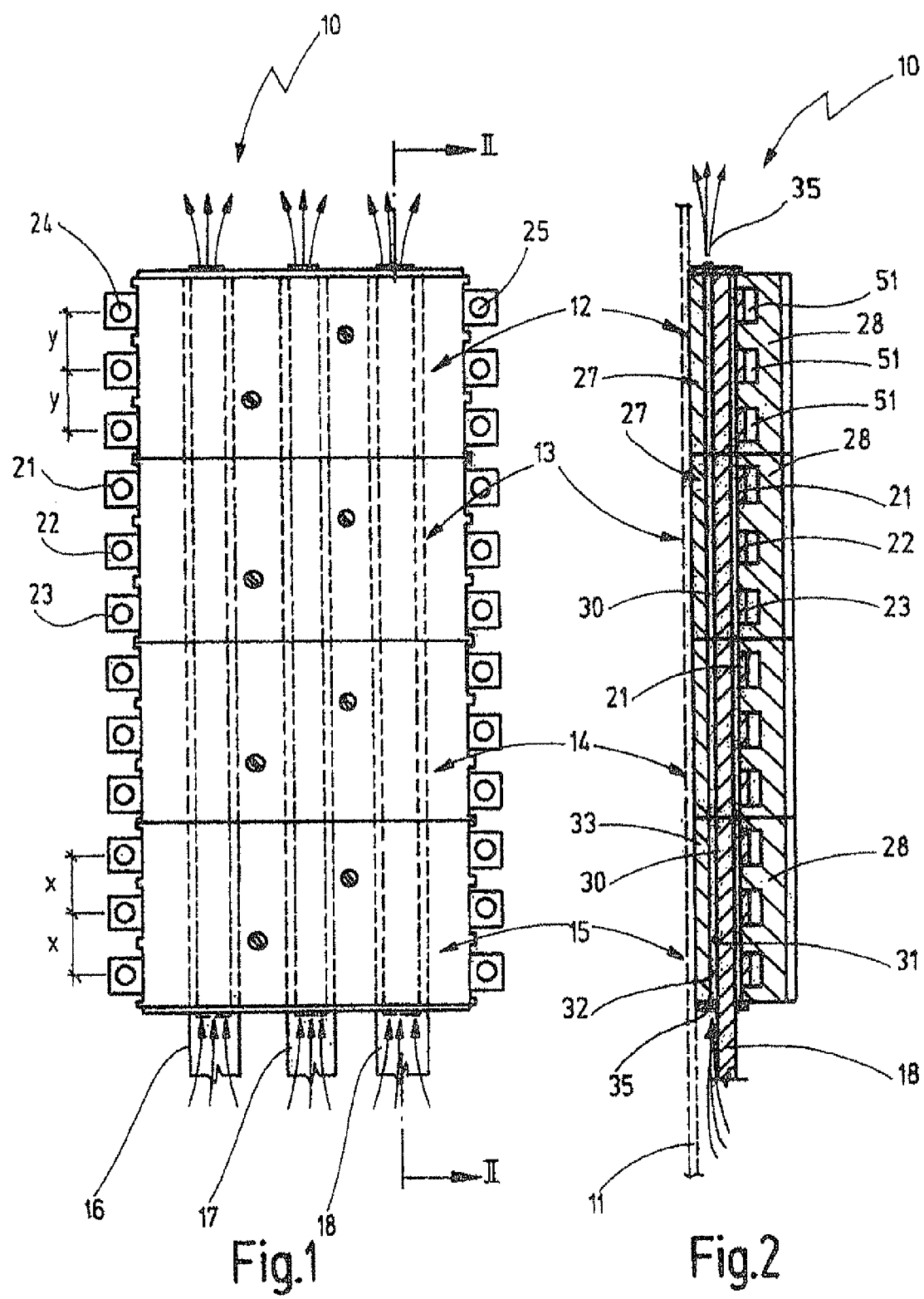

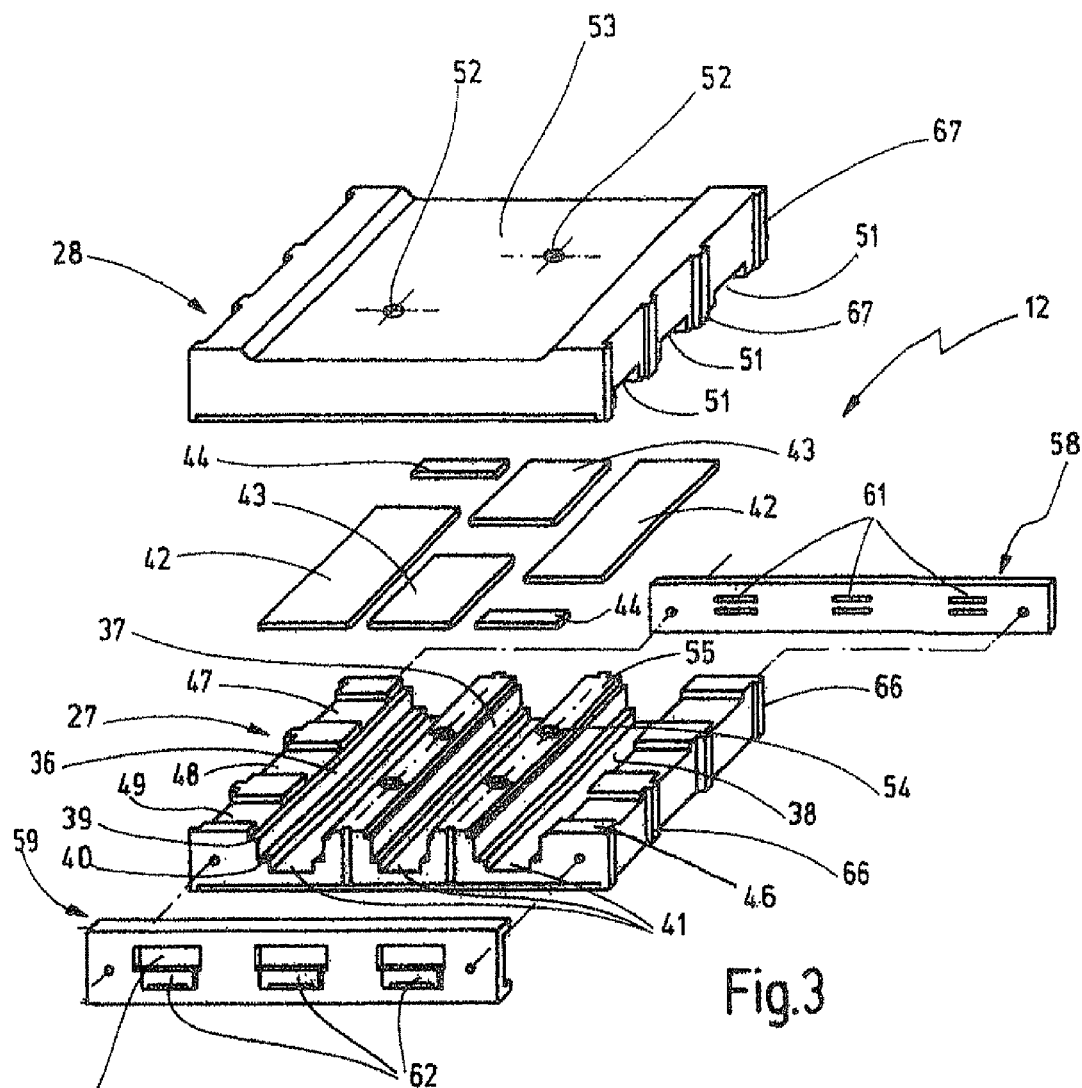
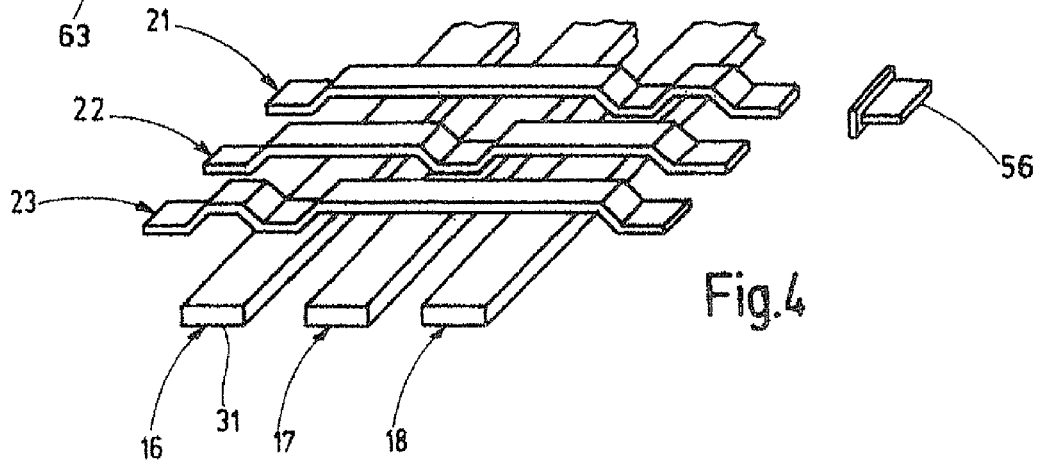

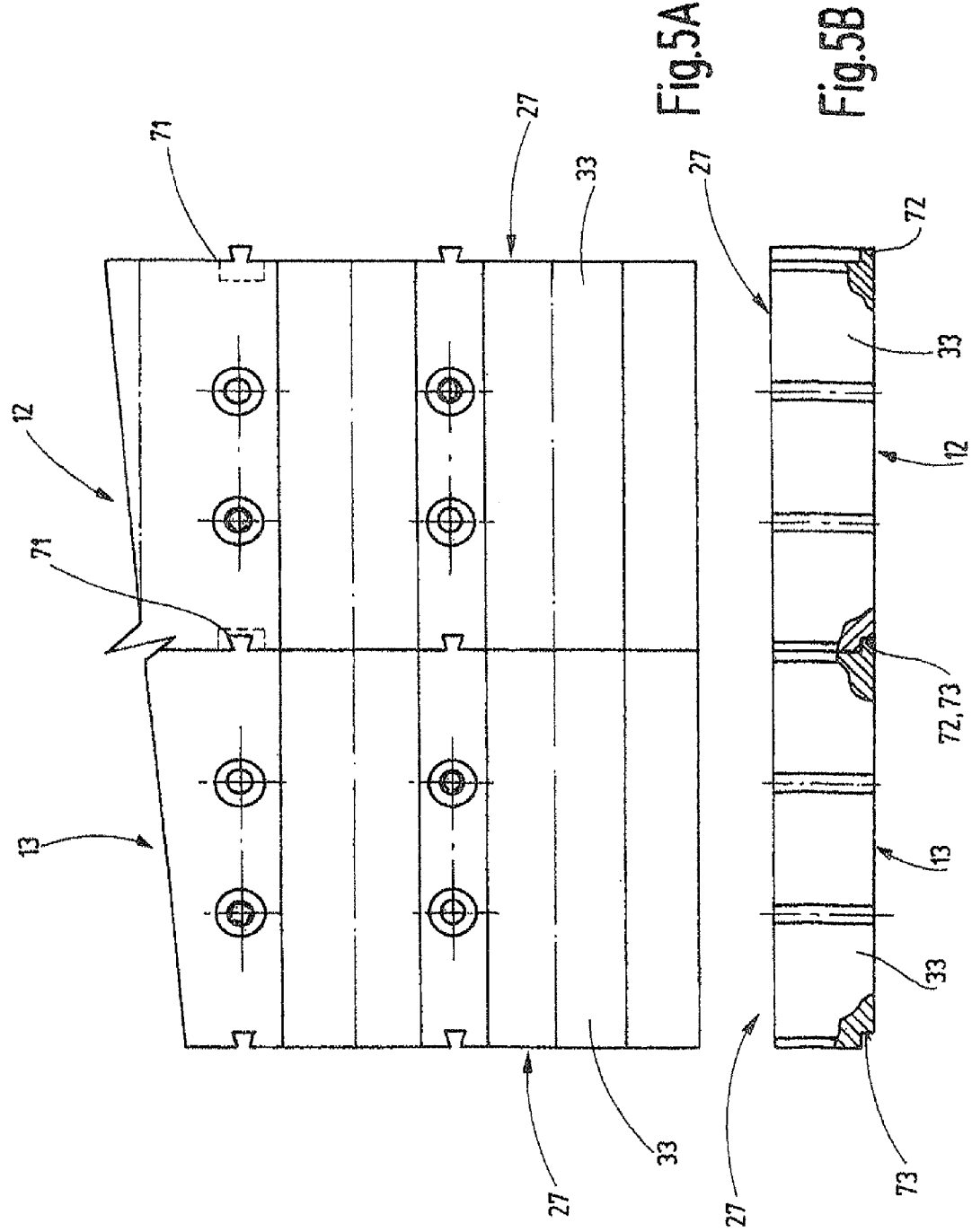

CLOSED BUSBAR SYSTEM FOR LOW-VOLTAGE DISTRIBUTION

TECHNICAL FIELD

The present invention relates to a closed busbar system for one- or three-phase, in particular low-voltage distribution including longitudinally extending phase bars and transversely extending branch bars, one of which is respectively electrically connected to an associated phase bar.

BACKGROUND DISCUSSION

In known closed busbar systems of this type, the arrangements prepared with respect to the length of the phase bars and with respect to the number of branch bars are capped with for example an epoxy resin and housed in a switch cabinet. Thereby, any subsequent corrections and/or extensions are not possible. In addition, the number of the branch bars to be provided must already be known in the design phase. Furthermore, in such capped busbar systems, the problem associated with heat development for example due to short-term increase in power is not solved in particular in southern countries.

SUMMARY OF THE INVENTION

Therefore, it is the object of the present invention to provide a closed busbar system of the initially mentioned type, which can be constructed and extended in simple manner and/or can be optimally employed considering the heat development.

For solving this object, in a closed busbar system of the mentioned type the phase bars are kept inserted in a socket of an insulating housing such that a cooling channel is formed associated with each phase bar between a phase bar rear side and a bottom inner side of the socket.

By the measures according to the invention, a closed busbar system simply to be constructed and adapted to the corresponding requirements is provided, in which the heat arising in particular on the phase bars can be at the same time passively or actively dissipated. In this manner, electrical conductor material can be saved or the power can be increased with the same bar cross-section.

Therein, the following advantages respectively result:
1) The system can be designed 2-, 3- or 4-phase.
2) All phases are completely separated from each other.
3) Simple assembly: The busbar system is built on a mounting plate, which can subsequently be mounted in a cabinet.
4) The system is suitable for power switches (main and sub-distributors) and line protective switches (final distributors) according to construction.
5) The heat is dissipated through cooling channels for each phase—a short-term increased current carrying capacity can be resisted.
6) The mechanical strength is achieved by glass fiber reinforced polyester.
7) Due to the used material, excellent electrical values result.
8) The system can be designed according to various electrical and mechanical specifications.
9) The proposed bar cover corresponds to the finger protection for power switches and line protective switches. The height of the cover is approximately the height of the installed branch circuit breaker.
10) The branches can be provided in full, hole or fork design.
11) An inspection of the busbars is possible by removal of the bar cover.
12) An assembly of the blocks is possible with various center distances for the branches in a system.

The present invention further relates to a closed busbar system including longitudinally extending phase bars, transversely extending branch bars, one of which is respectively electrically connected to an associated phase bar and an insulating housing assembly which receives the phase bars and the branch bars. The insulating housing assembly can be assembled by insulating housing modules linkable to each other in the direction of the longitudinal extension of the phase bars.

In order to solve the initially mentioned object, such a closed busbar system is formed according to a modular configuration, wherein this modular configuration is also possible independently of provided cooling channels for dissipating heat arising in the busbar system.

Besides the extremely variable adaptability to designs, subsequent modifications and the like, such a modular construction has the further advantage of economical, fast and simple assembly. In addition, the following advantages result:
a) A saving in the tool costs, because the size of the sockets and covers is preset to the width of the busbar assembly and the size of the switches on a branch—thus is small (a tool for the entire assembly of a system is practically not feasible).
b) Cost saving in copper (aluminum) of the busbars since a reduced cross-section for the specified amperages is sufficient due to the heat dissipation possible through the cooling channels.
c) Cost saving in manpower since one person can construct this system. By this construction, the parts are small and easily manageable by one person.
d) It is an ideal system for mass production of standard blocks for preset amperages, which can be prefabricated, kept in stock and then assembled according to specification of the number of outlets.
e) The busbar system can also be quickly produced according to latest project revisions.
f) The assembly is faster with respect to other systems, since for example time for drying an insulating compound is not required.
g) The system can be easily adapted to the various regulations of the local utilities, especially since various blocks can be easily reconstructed and produced, which considerably reduces the construction costs.
h) The system is applicable to main cabinets, in which feeds and outlets can be mounted to a mounting plate, as well as to sub- and final distributor cabinets.

BRIEF DESCRIPTION OF THE DRAWINGS

Further details of the invention can be extracted from the following description, in which the invention is described and explained in more detail by way of the embodiment illustrated in the drawing; wherein FIG. 1 shows in a schematic top view a closed busbar system for three-phase low-voltage distribution according to a preferred embodiment of the present invention, FIG. 2 shows a section along the line II-II in FIG. 1, FIG. 3 shows in an exploded perspective diagram one of the insulating housing modules used in the illustration according to FIGS. 1 and 2 without phase and branch bars, FIG. 4 shows in a perspective diagram the three-phase arrangement of phase and branch bars as they are insertable into the module according to FIG. 3, and FIGS. 5A and 5B show a top view and a front view, respectively, of two insulating housing modules assembled to each other.

DETAILED DISCUSSION IN CONJUNCTION WITH THE DRAWINGS

The closed busbar system 10 illustrated in the drawing according to a preferred embodiment serves for one- or three-phase voltage distribution for example in the low-voltage range of 380/400 Volts and is disposed on a building wall or the like through a base plate 11 and surrounded by a switch cabinet. Therein, the closed busbar system 10 is suitable for both sub-distributors and final distributors. Typical specifications of such busbar systems are apparent from ANNEX 1.

According to FIGS. 1 and 2, the closed busbar system 10 is constructed of plural modules 12 to 15 of an electrical insulating housing, wherein the insulating housings or modules 12 to 15 can be identical or different in that the center distances x and y yet to be explained can be different. In addition, the insulating compound housing modules 12 to 15 can be formed both for three-phase systems as illustrated in the drawing and for one-phase systems, thus for phase and neutral conductors.

According to FIGS. 1 and 2, phase bars 16, 17 and 18 extend across the entire length of the four modules 12 to 15 or of the busbar system 10, wherein three transversal branch bars 21, 22 and 23 are respectively disposed per module 12 to 15, which protrude to both sides from the respective module 12 to 15 and are provided with attachment holes 24 and 25 in the embodiment.

Each insulating housing module 12 to 15 has a socket 27, as is apparent from FIG. 2 and in particular FIG. 3, in which the phase bars 16 to 18 are inserted, and a socket cover 28 covering and receiving the transversal branch bars 21 to 23.

As is apparent from FIG. 2, the sockets 27 of the insulating housings 12 to 15 are attached to the base plate 11 and the covers 28 are attached to the sockets 27 next to each other. The phase bars 16 to 18 are disposed within the socket 27 such that a cooling channel 30 of here preferably about rectangular cross-sectional configuration results between the lower side 31 of the phase bars 16 to 18 and the opposing inner side 32 of the bottom 33 of the socket 27. The individual cooling channels 30 in the sockets 27 are aligned with each other by the arrangement of the plural linked modules 12 to 15 such that according to FIG. 2, a cooling air flow 35 from bottom to top through the busbar system 10 results. This cooling air flow 35 along the phase bars 16 to 18 can be produced passively or actively by means of a fan.

In FIG. 3, in perspective exploded illustration, one of the insulating housing modules 12, 13, 14 and 15, respectively, is represented. Each insulating compound housing 12 to 15 is made of an electrical insulating material, for example of glass fiber reinforced polyester, which can for example be processed by means of injection molding.

In the embodiment, the socket 27 has three parallel spaced receiving grooves 36 to 38, which are formed identically and have a cross-section stepped mirror-inverted to their center plane. The receiving grooves 36 to 38 have two shoulder pairs 39 and 40 spaced in the direction of the depth of the groove 36 to 38, the lower shoulder pair 40 of which serves for supporting the phase bars 16 to 18 and has a certain distance to the bottom 41 of the receiving groove 36 to 38, whereby the mentioned cooling channel 30 arises in an approximately rectangular cross-section between the lower side 31 of the phase bars 16 to 18 and the bottom 41 of the receiving grooves 36 to 38. The distance of the upper shoulder pair 39 to the lower shoulder pair 40 substantially corresponds to the thickness of the phase bars 16 to 18.

Electrically insulating platelets 42, 43 and 44 with equal width and thickness, however different length are placed on the upper shoulder pairs 39 of the receiving grooves 36 to 38. The top of the platelets 42 to 44 lines up with the bottom 46 of transversal trenches 47, 48 and 49 for receiving the branch bars 21, 22 and 23, respectively. According to the arrangement of the branch bars 21 to 23 on the phase bars 16 to 18 (FIG. 4), each two platelets 42 and 44, two platelets 43 and two platelets 44 and 42, respectively, are used, which are located above the phase bars 16 to 18 and between the branch bars 21 to 23. The electrically insulating platelets 42 to 44 also for example made of glass fiber reinforced polyester are either loosely inserted or locked between the upper shoulder pairs 39.

The cover 28 has transversal recesses 51 facing the socket 27, which extend across the entire width of the cover 28 and serve for receiving the branch bars 21 to 23 as far as they are disposed raised above the phase bars 16 to 18, and for exit from the insulating housing 12 to 15. For example, the cover 28 is screwed to the socket 27 as it is apparent at the corresponding bores 52 of the ceiling 53 of the cover 28 or the bores 54 in the longitudinal lands 55 of the socket 27 provided between the receiving grooves 36 to 38.

As is apparent from FIG. 1, the center distances x and y of the branch bars 21 to 23 and thereby of the recesses 51 in the socket cover 28 and the transversal trenches 47 to 49 of the socket 27 can vary corresponding to the used switches or the like.

FIG. 4 shows the perspective arrangement of three branch bars 21 to 23 within a module 12 to 15 on the phase bars 16 to 18. The branch bars 21 to 23 are angled or folded such that each one branch bar 21 to 23 is electrically contacted and mechanically connected to each one phase bar 16 to 18. Otherwise, contact between the branch bars 21 to 23 and the phase bars 16 to 18 does not occur. At the same time, the ends of the branch bars 21 to 23 are angled on both sides in the ends protruding from the insulating housing 12 to 15 to the height of the phase bars 16 to 18 where they are connected to further lines and/or switches or the like apparatuses. An insulating sleeve 56 can be fitted to a blind end of a branch bar 21 to 23.

FIG. 3 moreover shows an upper cover strip 58 and a lower cover strip 59, which strips are not attached to each of the modules 12 to 15, but only to the respective final modules 12 to 15, thus, according to FIG. 1, to the upper module 12 and to the lower module 15, respectively. The upper cover strip 58 is provided with slot pairs 61 in the region of each cooling channel 30, while the lower cover strip 59 has a slot 62 rectangular in cross-section, which aligns with the cooling channel 30, and a recess 63, through which the respective phase bar 16 to 18 is passed. At the upper end of the busbar system 10, that is in front of the upper cover strip 58, the insulating covered phase bars 16 to 18 terminate.

As it is further apparent from FIG. 3, both the socket 27 and the cover 28 each have ledges 66, 67 protruding at their ends between the phase bars 16 to 18 and between the branch bars 21 to 23, respectively, which serve for extension of possible leakage paths.

FIGS. 5A and 5B show an embodiment of insulating housing modules 12 to 15 to be linked or linked to each other in the direction of the phase bars 16 to 18. For example, a groove and tongue joint in the form of a dovetail joint 71 is provided in the sockets 27 of the adjacent modules 12 and 13 between each two modules 12 to 15 (here 12 and 13). The groove and tongue joint 71 can also be configured in locking manner. According to FIG. 5B, the bottom 33 of each socket 27 is provided with a nose 72 at one end and with a groove 73 at the opposing end such that displaced leakage paths are provided here, too.

The invention claimed is:

1. A closed busbar system for one-phase or three-phase, in particular low-voltage distribution, including:
    an insulating housing having a plurality of sockets each with a bottom inner side;
    longitudinally extending phase bars each having a rear side; and
    transversely extending branch bars, one of which is respectively electrically connected to an associated phase bar, wherein:
    said phase bars are kept inserted in a respective one of said plurality of sockets of said insulating housing such that a cooling channel is formed associated with each of said phase bar between said phase bar rear side and said bottom inner side of said respective one of said socket.

2. The busbar system according to claim 1, wherein:
    said sockets are each respectively provided with a receiving groove formed stepped for forming the cooling channel(s).

3. The busbar system according to claim 1, wherein:
    said sockets are each provided with a cover strip, which is provided with venting slots.

4. The busbar system according to claim 3, wherein:
    one cover strip is provided with openings for said phase bars.

5. The busbar system according to claim 1, wherein:
    said sockets can be fitted with cover platelets, which are retained layable over said phase bars and between said branch bars.

6. The busbar system according to claims 2, wherein:
    said cover platelets can be placed on or in said receiving groove.

7. The busbar system according to claim 6, wherein:
    said cover platelets are identical in pairs.

8. The busbar system according to claim 6, wherein:
    said receiving groove is provided with two shoulder pairs provided in depth distance, the distance of which preferably corresponds to the thickness of the said phase bars.

9. The busbar system according to claim 8, wherein:
    said cover platelets can be locked between said upper shoulder pair.

10. The busbar system according to claim 1, wherein:
    said insulating housing has a cover provided with transversely extending receiving trenches for receiving said branch bars associated with said socket.

11. The busbar system according to claim 10, wherein:
    said receiving trenches extend across the entire width of said cover at one end or both ends.

12. The busbar system according to claim 11, further having:
    an insulating sleeve for said receiving trenches or the free end of said branch bars.

13. The busbar system according to claim 1, wherein:
    said insulating housing has a cover; and
    said sockets and/or said cover of said insulating housing is or are provided with protruding ledges in particular at their ends receiving said branch bar and between them.

14. A closed busbar system for one-phase or three-phase, in particular low-voltage distribution, including:
    an insulating housing assembly;
    longitudinally extending phase bars; and
    transversely extending branch bars, one of which is respectively electrically connected to an associated phase bar, wherein:
    said insulating housing assembly receives said phase bars and said branch bars;
    said insulating housing assembly can be assembled by insulating housing modules linkable to each other in the direction of the longitudinal extension of said phase bars; and
    said insulating housing modules are assembled to each other by a groove and tongue joint.

15. A closed busbar system for one-phase or three-phase, in particular low-voltage distribution, including:
    an insulating housing assembly;
    longitudinally extending phase bars; and
    transversely extending branch bars, one of which is respectively electrically connected to an associated phase bar, wherein:
    said insulating housing assembly receives said phase bars and said branch bars;
    said insulating housing assembly can be assembled by insulating housing modules linkable to each other in the direction of the longitudinal extension of said phase bars; and
    said insulating housing modules overlap each other on the bottom side.

* * * * *